United States Patent [19]

Hoppe et al.

[11] Patent Number: 4,478,517
[45] Date of Patent: Oct. 23, 1984

[54] PROCESS AND GRAVITY FEED MIXER FOR MIXING BULK MATERIALS IN A CONTAINER

[75] Inventors: Hans Hoppe; Helmut Bercx, both of Vogt; Wolfgang Siegel, Ravensburg, all of Fed. Rep. of Germany

[73] Assignee: Waeschle Maschinenfabrik GmbH, Ravensburg, Fed. Rep. of Germany

[21] Appl. No.: 408,197

[22] Filed: Aug. 13, 1982

[30] Foreign Application Priority Data

Aug. 18, 1981 [DE] Fed. Rep. of Germany ....... 3132591
Mar. 9, 1982 [DE] Fed. Rep. of Germany ....... 3208499

[51] Int. Cl.³ .......................... B01F 5/24; B01F 13/02
[52] U.S. Cl. .................................. 366/101; 222/459; 222/564; 366/341
[58] Field of Search ................ 366/341, 346, 347, 183, 366/136, 137, 101, 106, 107, 305, 9; 222/459, 547, 564; 414/288

[56] References Cited

U.S. PATENT DOCUMENTS

| 1,415,830 | 5/1922 | Fredel et al. | 366/336 |
| 1,985,791 | 12/1934 | McCarroll | 366/305 X |
| 3,361,413 | 1/1968 | Heyl | 366/137 |
| 3,741,223 | 6/1973 | Kavera et al. | 366/290 X |
| 4,286,883 | 9/1981 | Johanson | 366/336 X |

FOREIGN PATENT DOCUMENTS

| 477842 | 10/1951 | Canada | 414/288 |
| 255331 | 1/1913 | Fed. Rep. of Germany | 366/9 |
| 1263611 | 3/1968 | Fed. Rep. of Germany | 414/288 |

Primary Examiner—Philip R. Coe
Attorney, Agent, or Firm—Murray Schaffer

[57] ABSTRACT

The gravity feed mixing of bulk materials is effected by removing partial quantities of the material at each of a plurality of vertically disposed levels, and passing the removed material through a series of funnels arranged vertically so that the material is admixed with the material passing from a higher level and fed to a lower level.

7 Claims, 4 Drawing Figures

PROCESS AND GRAVITY FEED MIXER FOR MIXING BULK MATERIALS IN A CONTAINER

The invention concerns a process for gravity feed mixing of bulk materials in a container and in particular the process of removing partial quantities at various levels of the bulk material and subsequent admixture of these partial quantities. The invention further concerns a gravity feed mixer with a silo container having a conical bottom and built-in components for the extraction of partial quantities from different levels and their subsequent admixture.

A gravity feed mixer with these characteristics is known from DE-AS 17 57 540. The components for the extraction of the partial quantities of bulk material consist of several vertical pipes provided with a number of lateral openings which cut across a conical bottom of the silo container at their lower section and feed into a common discharge pipe. This solution is expensive to construct, producing substantial static problems as a result of the unilateral stresses affecting the pipes and their supports and in the end is not fully satisfactory with respect to the mixing result. The cause of this is the fact that, as a result of the lateral openings, the influx of the bulk material ensues only from one side and is not easily capable of being controlled quantitatively, In addition, the bulk material which is passed in through the openings located at the top and which flows down through the corresponding pipe can block the lateral influx of the bulk material through the lower-lying openings and can even bring this to a complete halt. As a result, this causes some sectors of the filling volume not to be involved in the mixing process.

The present invention is based upon the problem of developing a process and a gravity feed mixer of the type mentioned at the outset, in which the entire contents of the silo would be involved in the mixing process; with the silo container and, in particular, its built-in components being so constructed as to allow the static and dynamic stresses occuring in its operation to remain capable of being monitored and controlled.

SUMMARY OF THE PRESENT INVENTION

The solution, which has been demonstrated in practice, is based upon the fact that each partial quantity drawn from a certain level is immediately admixed to the partial quantities drawn from the levels lying above it.

A significant component of the demonstrated solution is the determination of the angle of the funnel opening in a way that assures that the so-called mass flow (as distinguished from the so-called core flow) i.e., an approximately equal sinking of the bulk material across the entire cross-section of the funnel, is attained. For determination of the maximal funnel opening angle, the stability parameters of the bulk material to be mixed, (angle of internal friction, wall friction angle, cohesion) must be determined by means of a shearing device on the pattern of the Jenike process. From the test data obtained from the Jenike process, a generally recognized standard process, the maximal funnel opening angle from which a mass flow can be assured, can be obtained.

BRIEF DESCRIPTION OF THE DRAWINGS

In the drawing a gravity feed mixer for carrying out the process according to the invention is schematically dsplayed along with a number of variants chosen for exemplification.

In the drawing.

DESCRIPTION OF THE INVENTION

Figure 1:
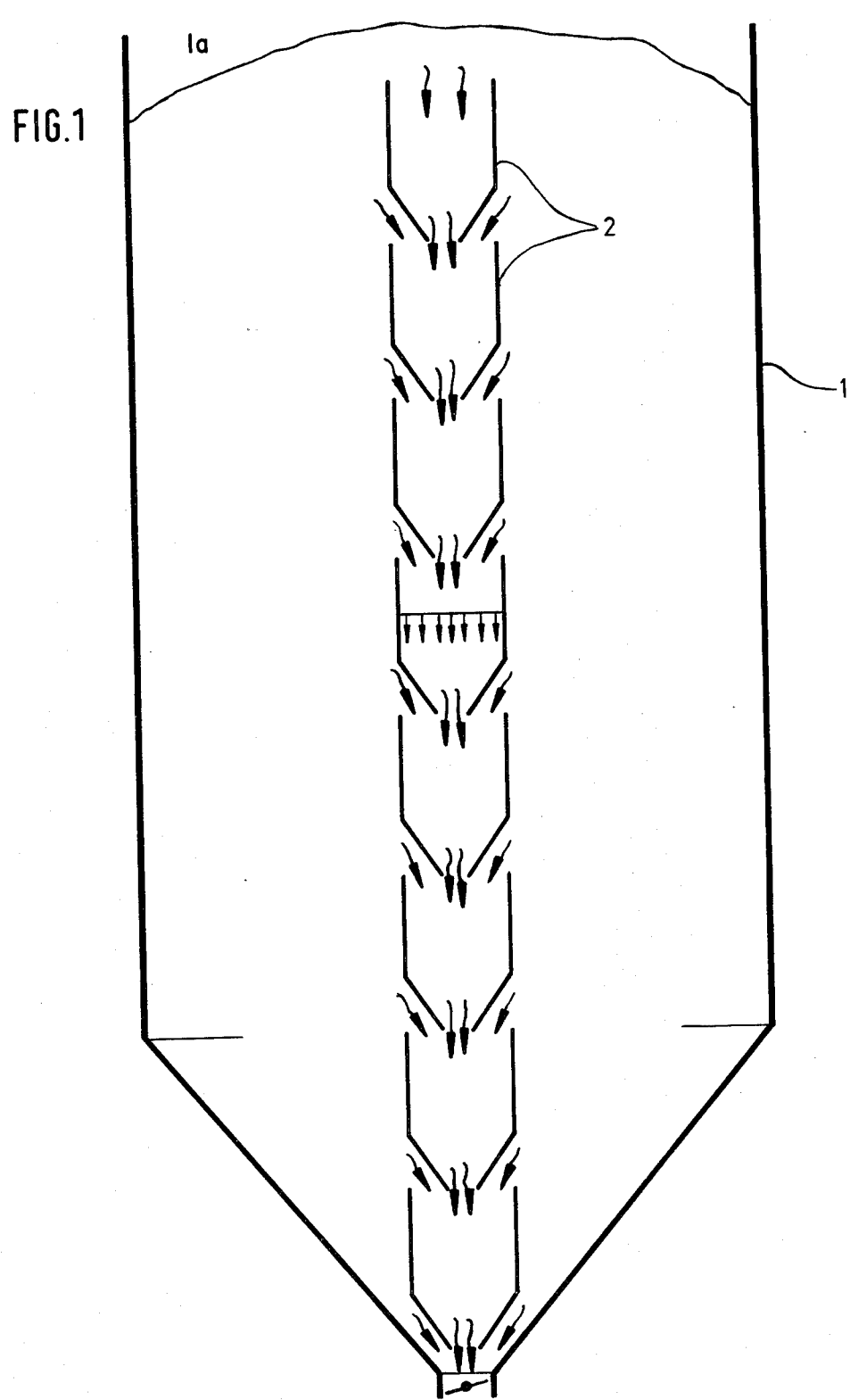
FIG. 1 shows a gravity feed mixer in longitudinal cross-section.

As depicted in FIG. 1, a silo container 1 having an open inlet top 1a is provided with numerous identical funnels 2 arranged one atop the other along the central axis of the silo. Each funnel consists of a cylindrical pipe-shaped section with an adjoining cone-shaped section. Each of these funnels empties at the level of the upper edge of the next lower funnel and thereby deposits its contents into the next lower funnel while simultaneously receiving additional bulk material at its upper end from the surrounding silo. It is important that within each funnel conditions of mass flow prevail wherein the bulk material in the silo, also moves into the funnel.

Figure 2:
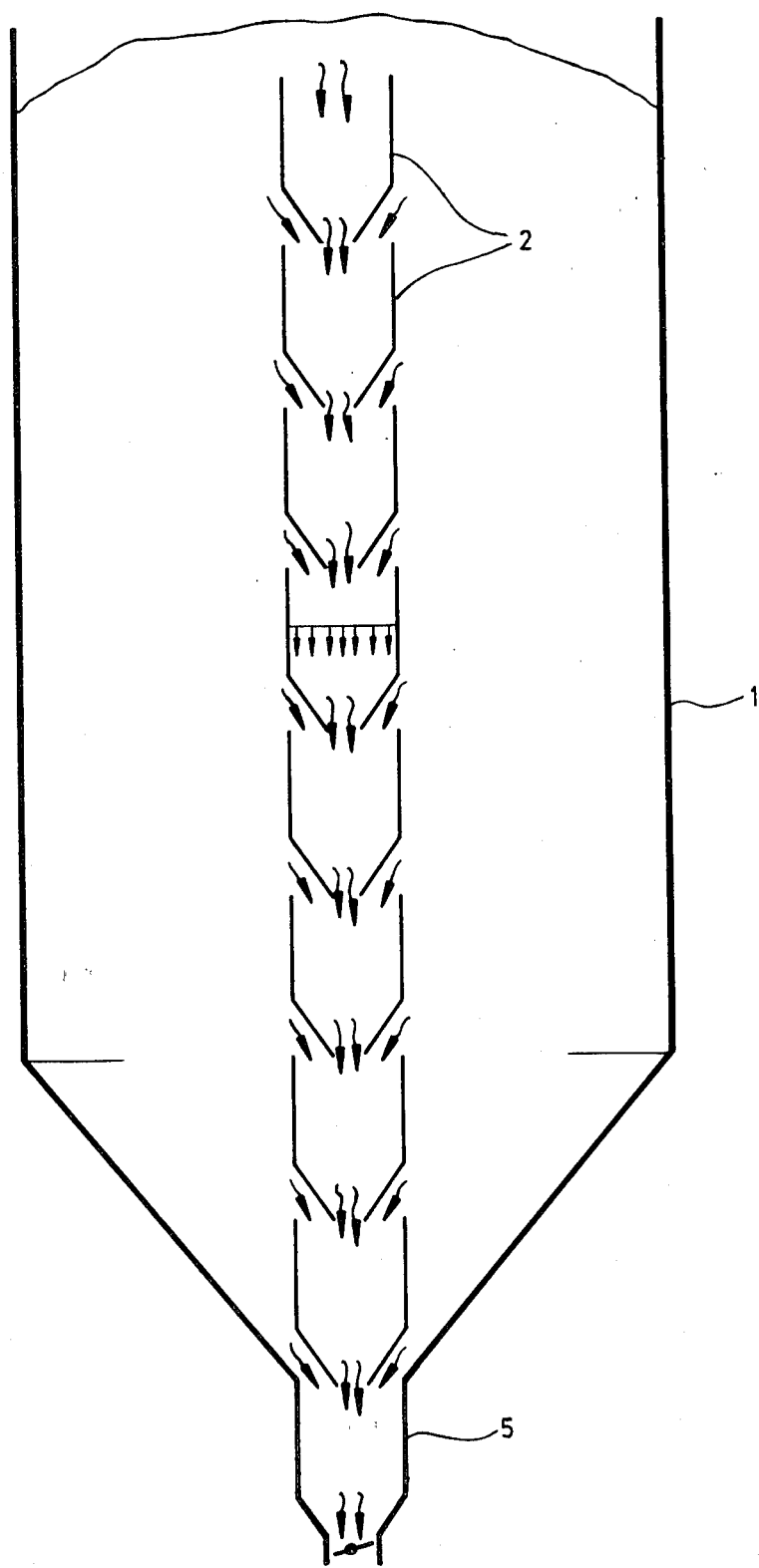
FIG. 2 shows a further development of this gravity feed mixer, also in longitudinal cross section.

In the variant shown in FIG. 2, the lowest funnel 5 is located outside the silo container, adjoining its conical bottom as opposed to the embodiment shown in FIG. 1, where the lowest funnel is inside the silo, and the silo is provided with an outlet.

Figure 3:
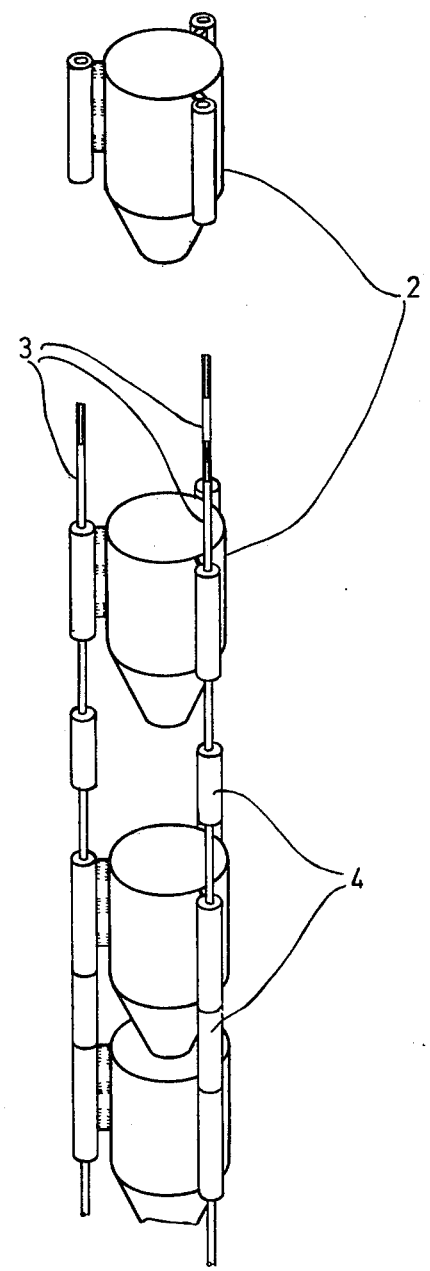
FIG. 3 is a representation of the mixer in perspective according to FIGS. 1 and 2 and FIG. 4 shows a futher variant of the mixer in longitudinal cross-section.

FIG. 3 shows a practical mode of fixing the funnels within the silo container. The funnels 2 are aligned on tension members by means of pipe lengths welded to the exterior wall of the funnels 2 parallel to their central axis. To maintain the necessary distance between the individual funnels, spacer collars 4 are used. Anchoring the tension member within the silo container takes place in any appropriate fashion known to the specialist with consideration of the static requirements.

Figure 4:
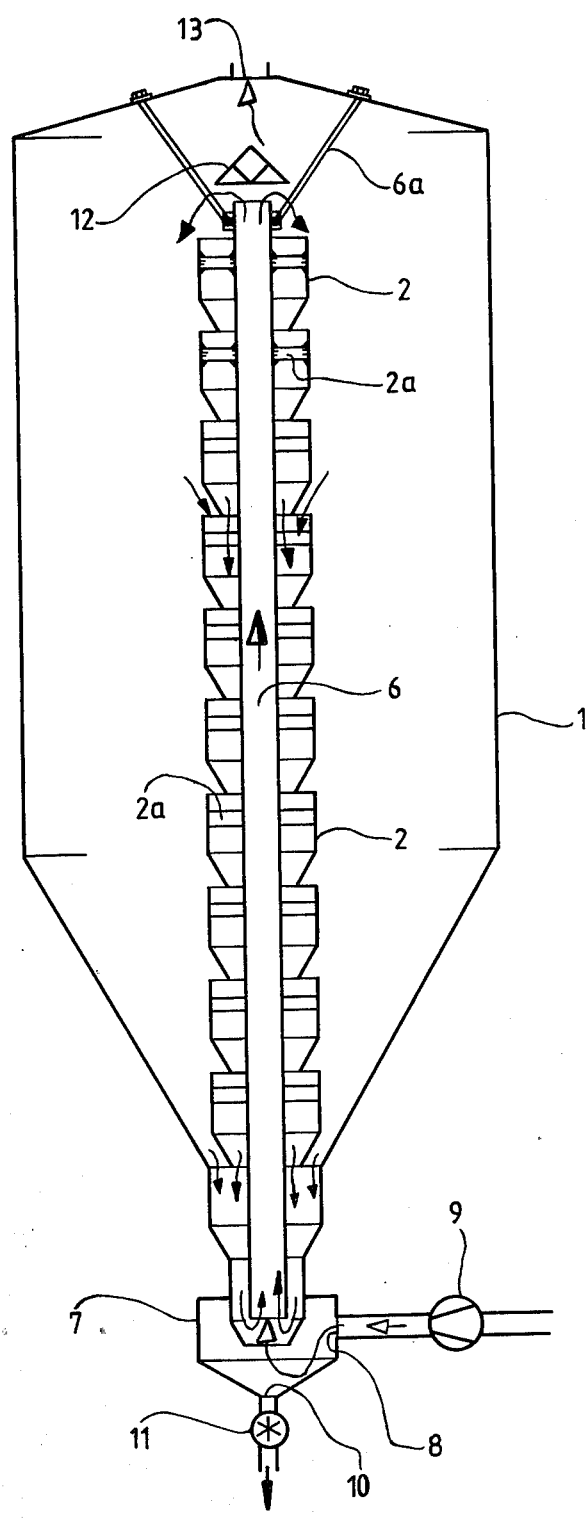

With the described gravity feed mixer, the bulk material extracted from the previously filled silo container is, as a rule, sufficiently homogenized. Only in the event of the filling of the silo container with charges that vary greatly in their properties and/or which have particularly high requirements for homogeneity, composition and properties of the extracted bulk material, does the mixing resulting after one flow-through fail to attain the requisite quality. For such a case the gravity feed mixer shown in FIG. 4 can be used to advantage. It contains an additional feedpipe 6, extending from the container egress area at the lowest and upward to a point above the topmost funnel 2. The feedpipe is fastened to a roof brace and has its upper port opposite a diversion cone 12. The egress opening of the silo container 1 is surrounded by a pot 7, which has a compressed air intake opening 8, which is connected to a compressor 9 by a pipe conduit. The pot 7 further has a conical bottom with an outlet opening 10, which can be closed with an appropriate device such as a bucket wheel sluice 11. In this variant the gravity feed mixer can also, if necessary, be used as a circulating mixer. For this purpose the partial quantity flow which has already been mixed a number of times, can at the discharge point of the silo container 1, be conducted back up in familiar fashion by compressed air pressure through the ascent feed pipe while the shutoff such as sluice 11 remains closed. The conveying air current can escape through an exit aperture 13 provided in the silo roof.

In addition, the funnels 2 are fastened to the ascent feed pipe 6 by appropriate braces 2a, so that special tension members are not required.

As seen from the foregoing, the process for the gravity feed mixing of bulk materials is carried out in the silo container by removal of partial quantities from annular shaped areas lying symmetrical to the central axis of the container at levels respectively corresponding to each of a plurality of vertical disposed funnels. The admixture of each partial quantity so removed is made with the partial quantity falling from the next higher level and further admixed with the material in the next lower level.

The apparatus comprises a gravity feed mixer in which a silo container, a conical bottom and a series of identical funnels arranged one atop the other along its central axis. The entrance cross-section of each funnel lies at the approximate height of the egress cross-section of the next higher funnel and the angle of the funnel opening is so fixed as to allow mass flow conditions to be attained for the bulk material lying in the silo at each level. If desired, ascent feed pipe may be placed inside the funnels making it possible to operate also a circulating mixer.

We claim:

1. A gravity feed mixer comprising a silo container having an inlet at its top for feeding bulk material thereto, a conical bottom having an outlet for said bulk material and built-in components for removal of bulk material quantities from said silo container at various levels and the subsequent admixture of the same, comprising a plurality of identical funnels, each comprising a cylindrical tube having a conical bottom and having a substantially smaller diameter than the diameter of said silo container, said funnels being arranged one above the other along the central axis of the silo, said funnels extending one within the other so that the intake cross-section of each funnel lies at approximately the same height as the egress cross-section of the next higher funnel and that the angle of the funnel opening is equal to or less than that required for the total mass flow of the bulk material at the corresponding level, but sufficient to provide partial quantity of material to be removed.

2. The gravity feed mixer according to claim 1, wherein the funnels are arranged on vertical tension members parallel to the central axis of the silo.

3. The gravity feed mixer according to claim 2, including spacer collars arranged between each of the funnels.

4. The gravity feed mixer according to claim 1, including a cylindrical section adjoining the egress cross-section of each funnel.

5. The gravity feed mixer according to claim 1, wherein the conical bottom of the silo container terminates at the intake cross-section of the lowest funnel, the egress cross-section of which forms the silo egress.

6. The gravity feed mixer according to claim 1, including an ascent feed pipe arranged concenrically along the axis of the container through the center of said funnels and being spaced at a distance from them, and that the egress of the silo terminates in a pot having a compressed air intake opening and a bulk material egress capable of being closed.

7. The gravity feed mixer according to claim 6, wherein the funnels are attached to the ascent feed pipe.

* * * * *